United States Patent

[11] 3,577,830

| [72] | Inventor | Aurelio Ortelli |
| | | Bologna, Italy |
| [21] | Appl. No. | 762,885 |
| [22] | Filed | Sept. 26, 1968 |
| [45] | Patented | May 4, 1971 |
| [73] | Assignee | Riva Calzoni S.P.A. |
| | | Milan, Italy |
| [32] | Priority | Sept. 29, 1967 |
| [33] | | Italy |
| [31] | | 2/059/67 |

[54] HYDRAULIC MOTOR
4 Claims, 5 Drawing Figs.

[52] U.S. Cl. ..................................................... 92/66,
  92/72, 91/176
[51] Int. Cl. ............................................... F01b 15/00
[50] Field of Search............................................ 92/68, 255,
  256; 103/159, (Inquired); 230/175, (Inquired);
  91/202; 92/66, 72; 91/176

[56] References Cited
UNITED STATES PATENTS

| 883,430 | 3/1908 | Smith et al. ................. | 91/176 |
| 2,347,663 | 5/1944 | Carnahan ..................... | 103/159X |
| 3,040,716 | 6/1962 | Hahn............................ | 91/176 |
| 3,168,006 | 2/1965 | Bennett........................ | 91/176 |
| 3,168,007 | 2/1965 | Wiedmann ................... | 91/176 |
| 3,227,094 | 1/1966 | Cailloux ....................... | 103/159 |
| 3,320,902 | 5/1967 | Paschke ........................ | 92/130X |
| 3,412,647 | 11/1968 | Paschke ........................ | 92/72X |

*Primary Examiner*—Martin P. Schwadrun
*Assistant Examiner*—Irwin C. Cohen
*Attorney*—Guido Modiano and Albert Josif

ABSTRACT: A hydraulic motor with radial propelling members, which includes a shaft provided with a cam with a spherical surface, around which a plurality of radial propelling members is arranged and in which each of said propelling members is composed of a tubular element of telescopic form attached to resilient means which initially maintain one end of said tubular element in contact with the spherical surface of the cam and maintain the other end of said tubular element in contact with a cap or a fixed striker with a spherical surface, the chamber defined by the said tubular element being in alternate communication with a source of compressed fluid and with a discharge line.

INVENTOR.
Aurelio ORTELLI

INVENTOR.
Aurelio ORTELLI

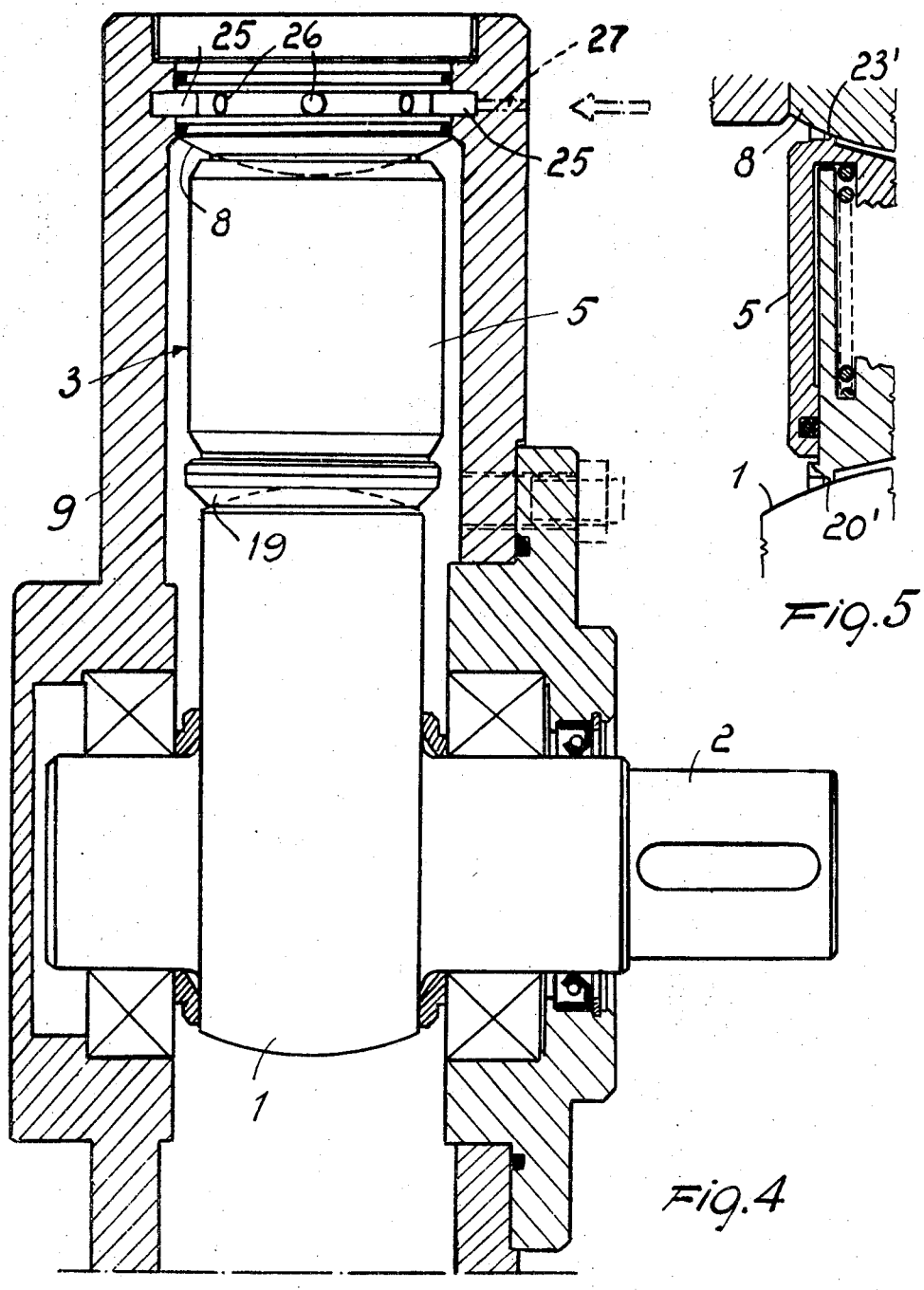

HYDRAULIC MOTOR

BACKGROUND OF THE INVENTION

This invention relates to a hydraulic motor with radial propelling members or units, particularly suitable for driving tracked equipment, cranes, buckets, winches, windlasses and the like.

It is well known that a hydraulic motor of the radial piston type normally consists of a plurality of radial pistons arranged around a cam integral with the driving shaft of the motor. The pistons are driven by the fluid under pressure through distributors and act on the lateral surface of the cam by means of connecting rods carrying sliding contact elements whose contact surfaces have a shape complementary to that of the surface of the cam.

IN practice however such a motor has numerous disadvantage among which that of heavy wear at the said sliding contact surfaces, on the radial pistons and on the respective connecting rods, as a result of which the operation is not always regular and frequent substitutions of parts are necessary.

A further disadvantage of the conventional hydraulic motors with radial pistons is that they may be subject to jamming or defective operation in the case of even slight misalignment of the shaft.

The main object of this invention is that of obviating the drawbacks above mentioned disadvantages of conventional hydraulic motors with radial pistons, by providing a hydraulic motor with radial propelling members in which friction is almost completely eliminated, thus considerably reducing the wear on the parts, so that a more regular and long lasting operation, and an increased mechanical efficiency are obtained.

A further object of the invention is to provide a hydraulic motor in which there is a continual self alignment of the various parts thereof, in relation to the possible deformations or slight movements in the system.

SUMMARY OF THE INVENTION

These and still further objects are attained by a hydraulic motor with radial propelling members according to the invention, which includes a shaft provided with a cam with a spherical surface, around which a plurality of radial propelling members is arranged and in which each of the said propelling members is composed of a tubular element of telescopic form attached to resilient means which initially maintain one end of said tubular element in contact with the spherical surface of the cam and maintain the other end the other end of said tubular element in contact with a cap or a fixed striker with a spherical surface which is rigid with the housing of said motor and is provided with at least one passage port complete with its respective distributors for putting the chamber defined by the said tubular element into alternate communication with a source of compressed fluid and with a discharge line, the pressure on the surface of the cam and on the fixed striker or cap being exercised directly by the said fluid during the communication of the said chamber with the source of compressed fluid, said tubular element further comprising sealing gaskets adjacent the striker, adjacent the cam, and between the parts comprising the said element of telescopic form.

BRIEF DESCRIPTION OF THE DRAWINGS

Further characteristics and advantages of the invention will better appear from the following detailed description of a preferred but not exclusive embodiment of a hydraulic motor with radial propelling members or units according to the invention, illustrated by way of example in the accompanying drawing, in which:

FIG. 4 shows a section along line IV–IV of FIG. 3;

FIG. 5 shows a detail of modified sealing means.

DESCRIPTION OF THE PREFERRED EMBODIMENTS

Figures 1, 2:
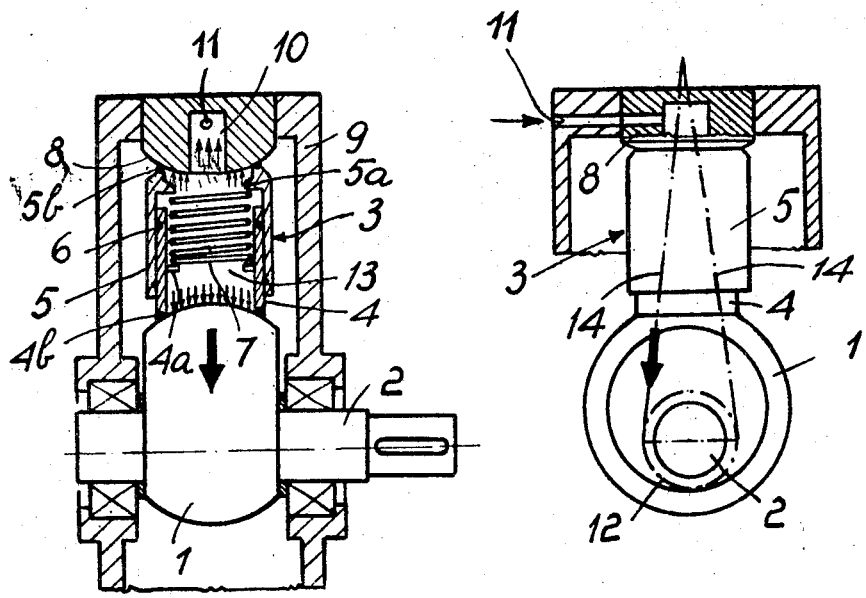
FIG. 1 is a partial axial sectional view of a hydraulic motor according to the invention, showing only one of the cylinders in order to diagrammatically indicate the principle.
FIG. 2 is a lateral diagrammatic view of the motor of FIG. 1.

Referring to FIGS. 1 and 2, the hydraulic motor with radial propelling members according to the invention includes a cam 1, consisting of a spherical middle segment arranged with its axis parallel but not coincident with the axis of a shaft 2 on which it is keyed. Around the cam 1 propelling members 3 are arranged at regular intervals (for example 3, 5 or more in number) each of which consists of a tubular element of telescopic form (in the FIGS. only one member 3 is shown). More precisely, said tubular element 3 comprises two tubular cylindrical portions 4 and 5 coaxially arranged so as to tightly slide one inside the other. Between the portions 4 and 5 at least one sealing gasket 6 is provided while a spring 7 is arranged between projections 4a and 5a which are integral with the portion 4 and the portions 5, respectively, the spring exercising an action which tends to lengthen the tubular element 3.

The tubular portion 4 is thus urged in sliding contact engagement with the surface of the cam 1, and sealing is assured by a gasket 4b secured to the edge of the said portion 4, while the tubular portion or cylinder body 5 is in sliding contact engagement with the surface of a spherical cap or abutment 8 secured to the housing 9 of the motor. A sealing gasket 5b is also provided at the edge of the tubular portion 5.

The spherical cap 8 contains a passage 10 which communicates at one end with the chamber 13 defined by the tubular portions 4 and 5 and at the other end with an immission pipe 11 connected to a distributor (not shown) which connects the said pipe 11 alternately to a source of compressed fluid and to a discharge line, according to a predetermined sequence.

When cam 1 rotates, the center of its middle circular section describes a circle 12 (FIG. 2) to which the lines of application of the forces exerted by the propelling elements 3 are tangential in the positions of maximum displacement.

On passing the compressed fluid, for example compressed oil, through the pipe 11 and the passage 10 into the chamber 13 defined by the tubular portions 4 and 5 of a propelling member 3, and the oil pressure is transmitted on to the surfaces of the cam 1 and the cap 8 so that the cam is caused to rotate around the axis of the shaft 2, while the propelling member 3 will oscillate slightly with movements of the relative axis within the lines 14 shown in FIG. 2.

During the active phase, each propelling member 3 will lengthen when the fluid under pressure is passed into it while in the return phase the said propelling member will shorten, its internal chamber 13 communicating with a discharge line. In each case the spring 7 assures the immediate sliding contact engagement of the tubular portions 4 and 5 with the cam 1 and with the cap 8, respectively.

A scan be easily gathered, bearing in mind the fact that a plurality of propelling members 3 is arranged around the cam 1, the coordinated action of these propelling members is such as to determined the rotation of the shaft 2 with almost total absence of friction because the pressure on the portion 1 and on the cap 8 is exercised directly by the fluid under pressure.

Figure 3:
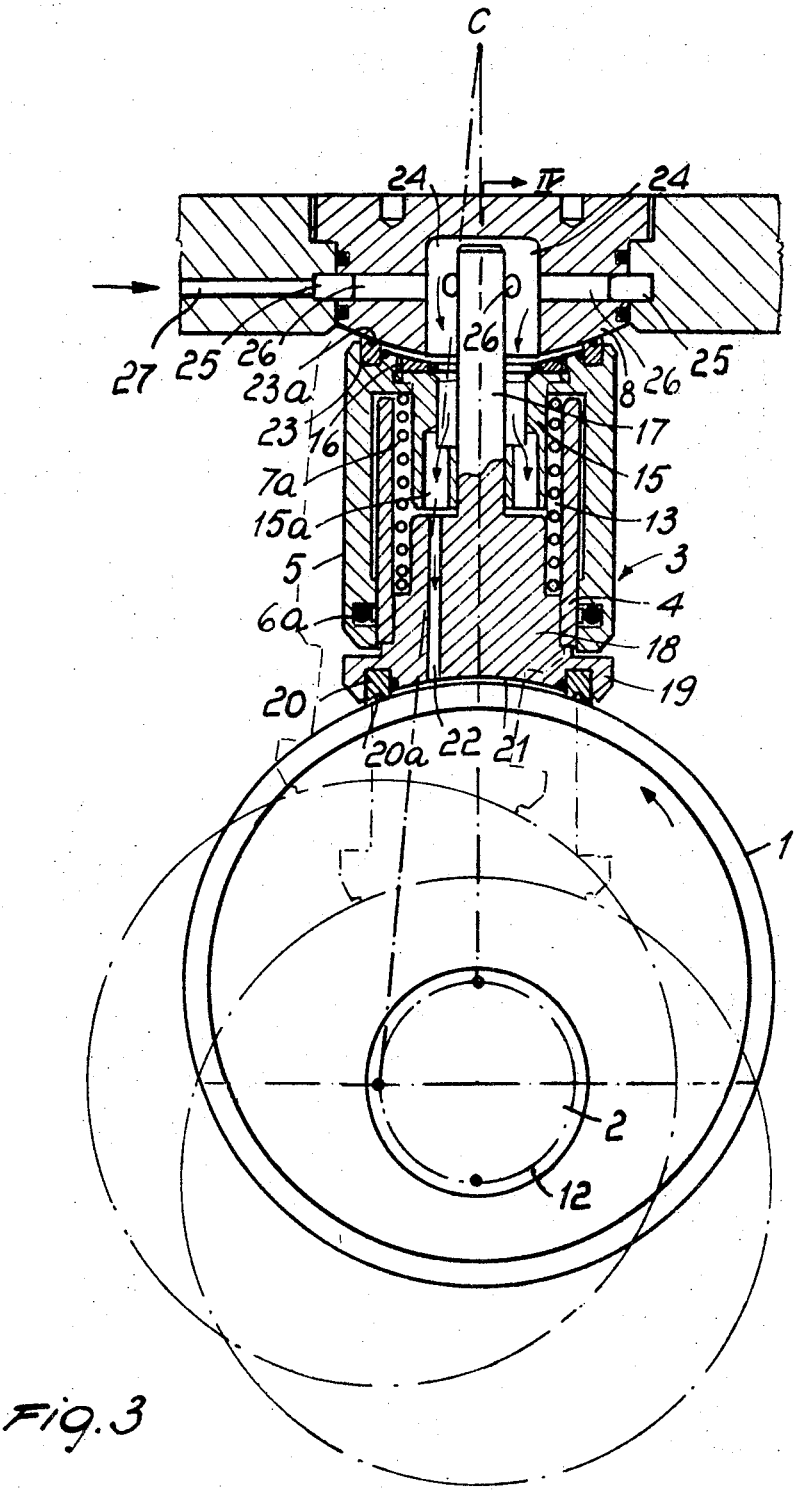
FIG. 3 shows a part of a hydraulic motor according to the invention in transverse section.

In FIGS. 3 and 4 a practical embodiment of the hydraulic motor according to the invention is shown. In these FIGS. only one propelling member 3 is shown, in a like manner to FIGS. 1 and 2, for simplicity, it being understood that a number of radial propelling members 3 are provided arranged at regular intervals around the cam 1.

In the embodiment represented in FIGS. 3 and 4, a sleeve 15 is provided which is arranged inside the tubular portions 4 and 5 and is made rigid with the portion 5 by means of a threaded nut 16 (FIG. 3).

Said sleeve 15 serves as a guide for a shaft 17 of a solid element 18 rigid with the tubular portion 4. The element 18 and portion 4 define a hollow piston member. This element 18 terminates at the part opposite to that provided with the shaft 17, in an enlargement 19 which supports, in a suitable seat or annular groove, a sealing ring 20 of resilient material. A gap or interspace 21 is defined between the element 18 and the surface of the cam 1 by said sealing ring 20, which constitutes an interspace means, this gap being in communication with the cavity 13 of the propelling member 3 by means of at least one passage or duct 22, so that the pressure is distributed uniformly over the working surface.

The seal between the tubular portions 4 and 5 is assured by a gasket 6a housed in a seat formed in the portion 5. The internal diameter of this latter portion is slightly greater than the internal diameter of the sealing gasket 20 attached to the element 18.

By this means a thrust is exerted on the gasket, due to the hydraulic forces, proportional to the pressure existing in the cylinder thus assuring the seal of the gasket itself under any pressure.

Between the portion 5 and the body 18 there is arranged a spring 7a which tends to lengthen the propelling member 3.

The seal between the tubular portion 5 and the spherical cap 8 is assured by a gasket 23 completely similar to the gasket 20, housed in a seat formed at the edge of the said portion 5. Also in this case the thrust on the gasket is proportional to the pressure existing inside the cylinder.

The gaskets 20 and 23 can be made with advantage of a plastic material of the type having characteristics of considerable elastic deformation with the possibility of compensating for the possible imperfections on the surface of contact.

The gaskets 20 and 23 contain in addition a groove 20a—23a at a position corresponding with the surfaces of contact, this groove communicating on the outside with passages arranged peripherally at a space from one another. In this way any possible infiltration of fluid can be readily eliminated towards the outside, thus avoiding the buildup of underpressures of infiltration which would tend to affect the sealing action of the gaskets.

Each spherical cap 8 has a hollow 24 inside which the end of the shaft 17 can penetrate, this hollow communicating with a surrounding annular cavity 25 through holes 26. The annular cavity 25 communicates in turn with an immission pipe 27 (FIG. 4) connected to a distributor and is put into communication by way of this latter alternately with a source of compressed fluid and with the discharge line.

As is clearly represented with dotted lines in FIG. 3, when the cam 1 rotates there is an oscillation of each propelling member 3 so that the relative axis moves around the center position until it reaches the position tangential to the circle 12 described by the center of the cam 1.

As indicated by dash-dot straight lines in FIG. 3 the center of angular displacement C of the propelling units lies on the side of the abutment member 8 opposite to the cam 1.

From the above the operation of the hydraulic motor shown in FIGS. 3 and 4 should be evident.

On passing the compressed fluid, for example compressed oil, into the chamber 13 of a propelling member 3 through the pipe 27, the annular cavity 25, the holes 26, the cavity 24 and the passages 15a provided in the sleeve 15, the element 18 is urged to move towards the cam 1 so as to exercise an adequate pressure on it. The hole 22 puts the interspace 21 into communication with the cavity 13 so that the same pressure in the said interspace 21 and the cavity 13 will occur. In effect the pressure on the cam 1 is not transmitted by the body 18 but by the compressed fluid inside the gap 21, or rather the operation is substantially analogous to that of the motors diagrammatically shown in FIGS. 1 and 2.

A minor part of the pressure transmitted to each propelling member 3 acts on the gasket 20 so that the seal on the cam 1 is assured. The force of adherence of the gasket 20 is determined by the fact that its internal diameter is slightly less than the internal diameter of the tubular portion 5. This consideration also applies to the gasket 23.

The pressure on the cam 1 is transmitted in succession by the various propelling members 23 arranged in manner such that the said cam 1 is caused to rotate.

At the right moment each propelling member 23 is connected to the discharge line, so that the said member shortens until it reaches its position of maximum shortening represented by the continuous line in FIG. 3.

During the variations of length each member 3 acts in a very compact way as the shaft 17 of the body or element 18 is effectively guided by the sleeve 15.

While the cam 1 rotates each propelling member 3 oscillates around the center position because of sliding of the tubular portion 4, or rather of the body 18 joined thereto, on the surface of the cam itself and of the tubular portion 5 on the spherical cap 8.

In the case of small misalignments of any nature there is an automatic realignment of the various parts of the motor because of the spherical form of the cam 1 and of the cap 8. In other words there is a self-alignment which ensures a perfect and regular operation of the motor.

As can be seen the hydraulic motor according to the invention produces a considerable reduction in friction because the pistons provided in traditional hydraulic motors are eliminated by transmitting the thrust directly by means of the compressed fluid.

The maintenance of the hydraulic motor according to the invention is very limited in its requirements, reducing itself only to the substitution of the gaskets 20 and 23, and 6a.

The invention as thus conceived may be subject to numerous variations and modifications within the scope of the appended claims.

Thus, as shown in FIG. 5, the gaskets or sealing rings 20 and 23 may be omitted and replaced by edges or ribs 20' and 23' integral with the element 18 and tubular portion 5 respectively and adapted to provide a suitable seal between relevant contacting metallic surfaces, at least the spherical surface of cam 1 being provided, for the purpose, by metallization, with a thin metallization layer.

I claim:

1. A hydraulic motor, comprising a housing, a shaft in said housing, a cam arranged on said shaft, a plurality of telescopically extensible propelling units disposed radially to said cam and each comprising an external hollow cylinder body and a hollow piston member slidable in said cylinder body, said cylinder body and said hollow piston member defining therebetween a space for a pressure fluid, an abutment member rigid with said housing and facing said cylinder body, spring means between said cylinder body and said hollow piston member for urging said cylinder body and said piston member against said abutment member and said cam, respectively, first interspace means defining a first interspace for a pressure fluid between said abutment member and said cylinder body and second interspace means defining a second interspace between said cam and said piston member, said space providing communication between said first and second interspaces and duct means for flowing the pressure fluid into and from said space, wherein according to the improvement, said cam and said abutment means have each a spherical sliding surface, said spherical sliding surfaces having their convex sides directed towards each other, thereby defining a center of angular displacement for said propelling units which lies beyond the sliding surface of said abutment member on the side opposite to said cam.

2. A hydraulic motor according to claim 1, wherein said cylinder body and said piston member have each on their ends facing the respective of said sliding surfaces, an annular groove near the periphery thereof for receiving annular sealing means in sliding contact with the respective of said sliding surfaces, thereby defining therewith said first and second interspace means, respectively.

3. A hydraulic motor according to claim 1, wherein at least one of said first and second interspace means comprises a circular rib formation on the sliding end of at least one of said cylinder body and piston member, facing the respective of said sliding surfaces, and arranged near the periphery of said sliding end, and a metallization layer on at least one of said sliding surfaces, said circular rib formation projecting from said end of at least one of said cylinder body and piston member and being in sliding and sealing contact with the respective of said sliding surfaces, thereby defining therewith at least one of said first and second interspaces.

4. A hydraulic motor according to claim 1, wherein said piston member has a piston rod and said cylinder body has a sleeve member arranged therein, said piston rod being sealingly guided inside said sleeve member.